United States Patent [19]

Maxey

[11] 4,087,129
[45] May 2, 1978

[54] CARGO GATE OPERATORS

[76] Inventor: Loren R. Maxey, 615 S. Loomis, Ft. Collins, Colo. 80521

[21] Appl. No.: 721,162

[22] Filed: Sep. 7, 1976

[51] Int. Cl.² .............................................. B60P 1/22
[52] U.S. Cl. .................................... 298/18; 105/306; 298/23 M
[58] Field of Search ................. 298/23 MD, 18, 23 S, 298/23 DF, 23 R; 105/286, 306

[56] References Cited
U.S. PATENT DOCUMENTS

| 2,431,588 | 11/1947 | Sharpe | 298/23 MD |
| 3,053,574 | 9/1962 | Peterson | 298/23 DF |

Primary Examiner—Drayton E. Hoffman
Assistant Examiner—George F. Abraham
Attorney, Agent, or Firm—Hugh H. Drake

[57] ABSTRACT

A vehicle-carried cargo box has a normally upright gate hinged along its lower margin so as to swing outwardly. An operator system includes a cable track sector mounted at one end of the gate to rotate about an axis as the gate is swung. One end of that sector is coupled to the gate above its lower margin. A motive drive system is mounted on the underside of the cargo box, and a cable is coupled between the track sector and that drive system. The cable is routed between the track sector and the drive system, operation of the drive system working the track sector by means of the cable to effect the opening and closing movement of the gate.

10 Claims, 5 Drawing Figures

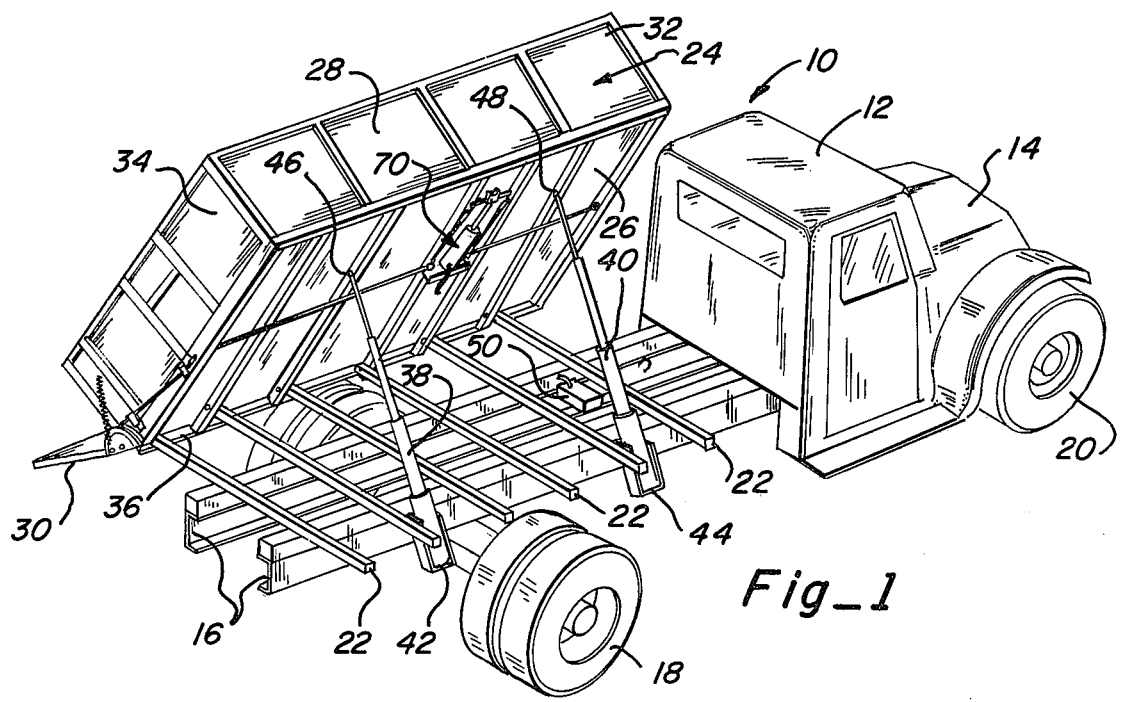
Fig_1
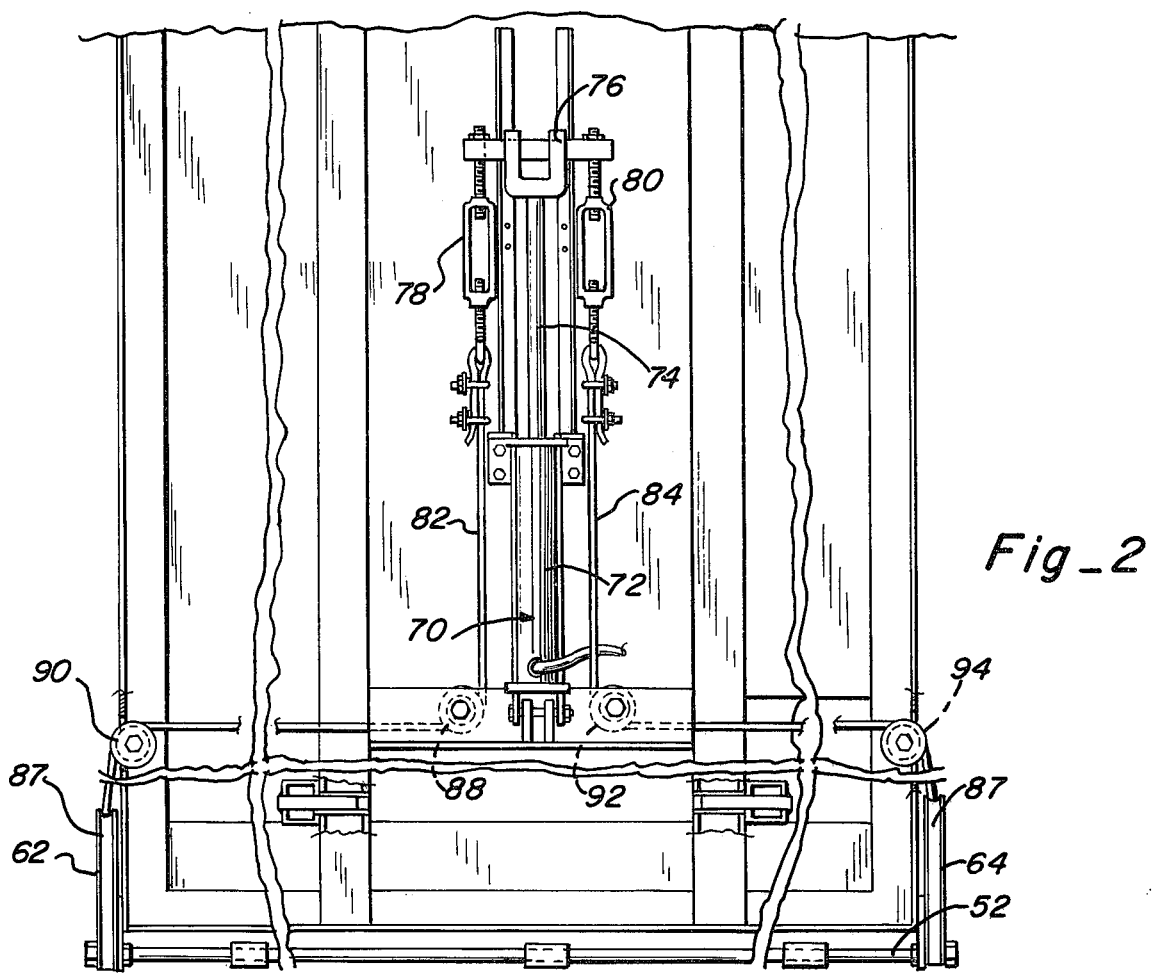
Fig_2

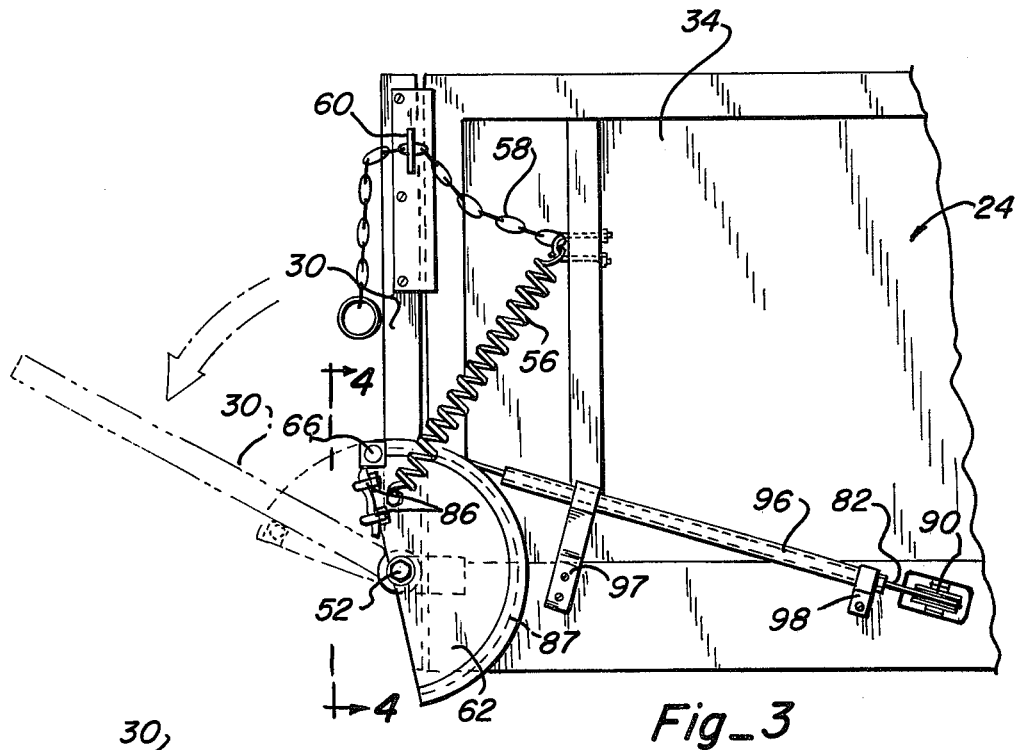
Fig_3
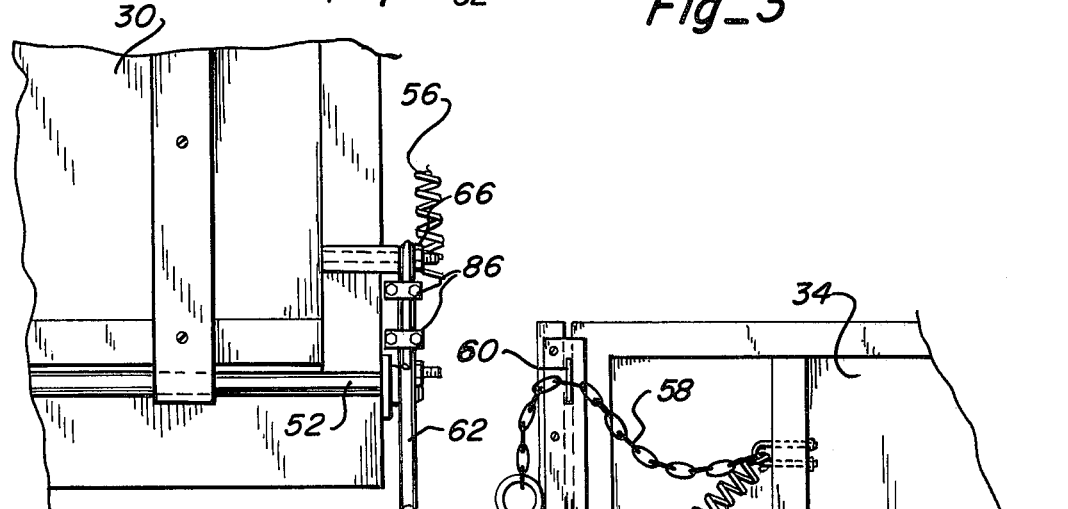
Fig_4
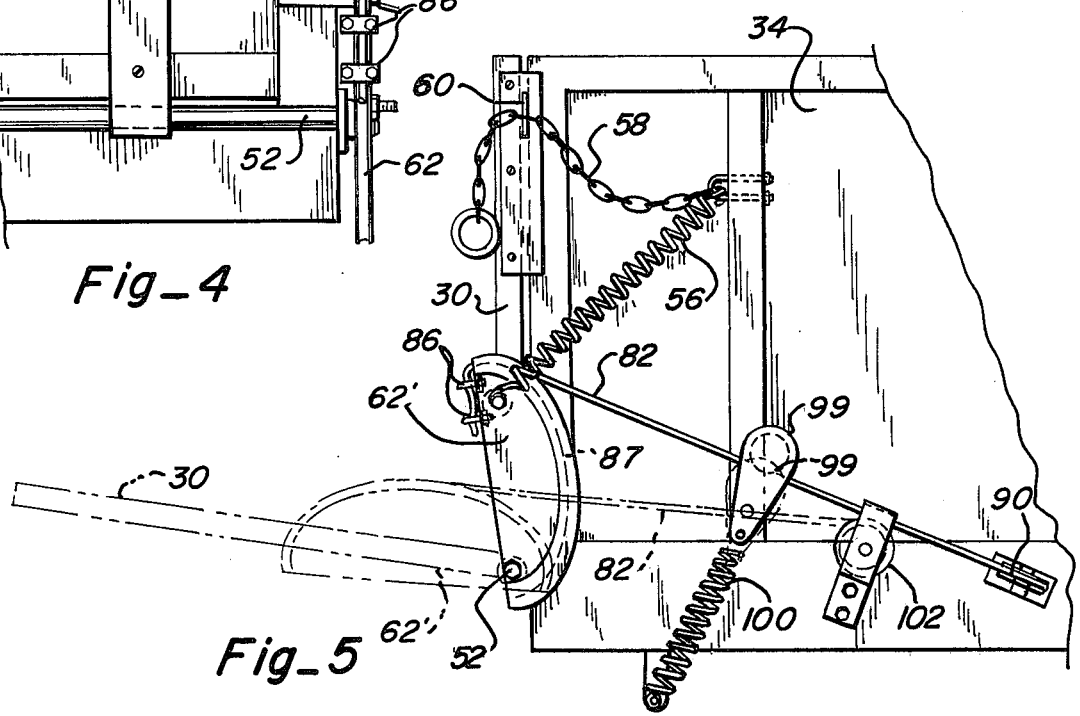
Fig_5

CARGO GATE OPERATORS

The present invention pertains to cargo gate operators. More particularly, it relates to such an operator to control a gate wall of a cargo box mounted on a vehicle.

For hauling and subsequently unloading agricultural products such as sugar beets, it is convenient and beneficial to use a dump truck of a kind having a rectangular cargo box and equipped with hydraulic rams or the like so as to cause that cargo box to tilt to one side for the purpose of unloading. Often, one longitudinal sidewall of the cargo box is hinged along its bottom margin so as to be capable of being swung from its top outwardly. This permits the load to slide unimpeded from out of the entire cargo box. Such gates may be manually latched and unlatched. Of course, that requires that the driver mount and dismount from the vehicle an undesirable number of times and, generally, serves to delay the unloading operation. Usually, weather conditions dictate that a maximum efficiency of operation be attained in order to move the crop in time.

Seeking to reduce the amount of and improve upon manual approaches, the prior art has sought to open and close cargo box side gates by means of the use of a hydraulic cylinder and piston mounted at each end of the side gate. The primary difficulty with that approach is the necessity of keeping two different piston cylinder arrangements in synchronism. Moreover, it becomes necessary to obtain essentially 180° of travel of the side gate, in order that, when fully open, it is held out of the way of the cargo which has just been unloaded into a pile or the like. That requirement tends to complicate design in that, in most linkage arrangements, one end has to be caused to go over center.

In various prior arrangements, such as that shown in U.S. Pat. No. 3,890,006 — Stockwell, various L-shaped levers are caused to coact with the operation of mechanical means so as to force open the side gate as the cargo box is tilted to one side. Other prior arrangements have used different linkage combinations, such as cooperating gear segments, for handling the sometimes great weight of the side gates that otherwise might require at least two persons to operate them manually.

All considered, these prior approaches have definitely been of assistance. Nevertheless, they often are unduly expensive, subject to lack of sufficiently unitary coaction and often subject to extensive maintenance. At least generally, they commonly feature what might be termed as a brute force approach, and this may lead to undue difficulty from such results as fatigue failure of components.

It is, accordingly, a general object of the present invention to provide a new and improved cargo box system that continues toward the desired objectives of the prior art while avoiding the deficiencies and difficulties therewith.

Another object of the present invention is to provide a new and improved gate system in which the gate normally is caused to close without the need for additional assistance to that operation.

A further object of the present invention is to provide a new and improved gate control system in which the gate may be raised or lowered regardless of position of the associated cargo box bed.

A specific object of the invention is to provide a new and improved operator that enables a maximum of holding power when in the closed position while yet requiring minimum travel of elements of the motive drive system.

In a vehicle system having a cargo box, there is at least one normally upright gate hinged along the lower margin so as to be swingable outwardly. To operate that gate, there is a cable track sector mounted at one end of the gate to rotate about an axis as the gate is swung. One end of the sector is coupled to the gate at a point above the lower margin. A motive drive system is mounted on the bottom side of the cargo box, and a cable coupled at one end to the track sector is coupled at the other end to the drive system. The cable is routed between the track sector and the drive system, operation of the drive system working the track sector by means of the cable so as to effect opening and closing swinging of the gate.

The features of the present invention that appear to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is a perspective view of a vehicle system having a cargo box which tilts for unloading;

FIG. 2 is a fragmentary bottom plan view of the cargo box included in FIG. 1 as well as of a motive drive system associated therewith;

FIG. 3 is a fragmentary rear-elevational view of a portion of a cargo box employing a side gate operator and, by phantom outline, showing a second position of one of the principal components;

FIG. 4 is a fragmentary side-elevational view taken along the line 4—4 in FIG. 3; and FIG. 5 is a fragmentary rear-elevational view similar to FIG. 3 but showing a modified arrangement.

In FIG. 1, a truck 10 serves as a vehicle system. It includes a typical cab 12 and engine compartment 14 all mounted generally upon a frame 16 in turn carried upon suitable axles which carry wheels 18 and 20. Secured laterally across frame 16 and behind cab 12 are a plurality of crossbars 22 spaced longitudinally one after the next along frame 16 so as to form a bed. Disposed generally atop the bed formed by crossbars 22 is the cargo box 24. The latter is generally rectangular in shape, having a bottom wall 26, right and left side walls 28 and 30, and respective front and rear end walls 32 and 34. In a typical dump truck of this kind for agricultural use, the bottom wall and the side walls are formed of heavy gauge wooden planking very firmly secured together by stringers disposed along all marginal edges and bars spaced periodically around or under the walls in the manner of studs and joists, all of this being illustrated for a conventional approach in FIG. 1.

The particular arrangement shown in FIG. 1 is arranged for dumping the contents of the cargo box to one side. To that end, the lower left horizontal margin of box 24 is hinged generally below side wall 30 so as to permit the entire cargo box to tilt about a hinge axis 36. A pair of longitudinally spaced hydraulic cylinder and piston combinations 38 and 40 project generally from respective trunnions 42 and 44 carried from the right side of frame 16. In turn, the outer piston ends 46 and 48 are secured to respective cross joists of the bottom wall of cargo box 24; of course, those connections permit rotational coupling so as to allow the tilting.

Mounted anywhere convenient on truck 10 is a hydraulic reservoir 50 associated with the usual hand-operated control for supplying or withdrawing hydraulic fluid under pressure with respect to cylinder combinations 38 and 40 for raising and lowering the right side of cargo box 24. By themselves, such side tilting systems, as well as end tilting systems, are well known and understood.

What has been referred to so far as left side wall 30 is actually a normally upright gate. To that end, gate 30 is hinged along its lower margin on a hinge pin 52 carried by the structural framing at the corresponding outer margin of bottom wall 26. To assist the operator whenever manually closing the gate, a tension spring 56 extends between a point secured to gate 30 itself and a portion of the structual framing intermediate the width of rear wall 34. Also secured from the latter is one end of a chain 58 a link of which near its other end may be conventionally slipped into a slot in a fastener 60 projecting rearwardly from the upper end portion of the rear edge of gate 30 so as to fully lock the gate in its closed, upright position.

Cable track sectors 62 and 64 are affixed respectively at each end of gate 30 on hinge pin 52 so as to rotate about the axis of the hinge pin as the gate is swung from its upright, closed position through a capability of 180° to a downwardly hanging open position. A fastener 66 couples the normally upper ends of sectors 62 and 64 to the corresponding edge margins of gate 30; thus, the upper end of each sector is coupled to the gate at a point above its own lower margin.

Mounted on the lower side of bottom wall 26 of cargo box 24 is a motive drive system 70 which in this case includes a linear motor in the form of a hydraulically operated cylinder 72 and its associated piston 74. The upper end of piston 74 faces right side wall 28 opposite what now has been defined as side gate 30. On that upper end of piston 74 is a yoke 76 from each lateral end of which is connected one end of respective turnbuckles 78 and 80. A cable 82 is connected at one end to the other end of turnbuckle 78, while a similar cable 84 is connected to the corresponding end of turnbuckle 80. The respective other ends of each of cables 82 and 84 are coupled respectively to track sectors 62 and 64. In more detail, each track sector includes a peripheral, outwardly facing groove or track 87 in which the corresponding cable end is received and from the upper end of which the free end of the associated cable is secured to the track sector by means of U-clamps 86; the bight portions of the U-clamps extend through corresponding openings within the wall of the track sector.

Also included is an arrangement for routing cables 82 and 84 between respective track sectors 62 and 64 and drive system 70. Thus, cable 82 is first turned over a pulley 88 and then another pulley 90 in its route from turnbuckle 78 to track sector 62. Analogously, cable 84 rides over pulleys 92 and 94 enroute to track sector 64. Pulleys 88 and 92 are disposed on respective opposite sides near the bottom of cylinder 72, while pulleys 92 and 94 are secured in appropriately aligned openings within the lower framework of respective rear and front walls 34 and 32. With the cables accordingly in place and routed in a manner permitting their movement, it will be observed that extension and withdrawal of piston 74 effects opening and closing of gate 30 by operation upon respective track sectors 62 and 64. Again, the hydraulic drive in itself is conventional. Fluid is communicated to and from the cylinder subject to manual control by the operator from a position such as in the cab in order to allow the side gate to swing open or, alternatively, to force it closed. It may be noted that closing the side gate at least almost always is made with the cargo box empty, so that the side gate need not be moved against anything but the force of gravity. On the other hand, opening of the side gate for the purpose of unloading is typically "helped" by force of the load contained within the cargo box. These characteristics assist in the function of drive system 70 and permit it to accomplish its assigned task without having to exhibit an undue degree of strength.

In FIGS. 3 and 4, drive sector 62 is in the form of a segment of a circular disc. In the modification of FIG. 5, however, track sector 62' is a segment of an ellipse. Section 62' is mounted on pin 52 near its lower end and is coupled to gate 30 near its upper end. This arrangement increases the holding power on side gate 30 in its closed position while yet permitting minimization of the amount of hydraulic piston travel required to effect the closing and opening of the sidegate.

In FIG. 3, a portion of cable 82 runs through an alignment tube 96 supported from rear wall 34 by brackets 97 and 98. This tube minimizes the tendency of the cable to jump from the peripheral groove on the track sector during operation. In another alternative as illustrated in FIG. 5, cable 82 slides under a pulley 99 resiliently held downwardly by a spring 100 secured to a portion of the frame of the cargo box 24. Pulley 99 and spring 100 together maintain tension in cable 82 during drive system operation. Also included is a guide pulley 102.

Even with a side gate operating system having a motive drive system which, as comparatively shown particularly in FIG. 1, involves a hydraulic actuator considerably smaller than activators 38 and 40 required to tilt the entire cargo box, the system herein described with regard to side gate 30 is fully capable of holding that gate closed except perhaps for some side-press type of loads such as shelled corn. The system is capable of either raising or lowering side gate 30 regardless of the tilt position of the overall cargo box. Yet the system requires for its installation and implementation only conventional parts of small sizes. The arrangement is such that the vehicle owner might well construct and install the system himself or it might be made at a local job shop. In particular, no unusually-shaped casting or other components are required.

In normal use, the operator need only drive alongside the dump pile and manipulate the hydraulic controls both to tilt up the cargo box and open the side gate. Immediately after the last part of the cargo has been dumped, the operator may begin movement out of the way at the same time as he once again manipulates the controls to close the side gate and bring the cargo box back to level position. Such efficiency of operation often becomes imperative for success in the agricultural industry. For example, it is not at all uncommon for there to be a race in time as between harvest of a crop such as sugar beets and the arrival of weather conditions that quickly could eliminate the remainder of the harvest.

While particular embodiments of this invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a vehicle system having a vertically tilting cargo box with at least one normally upright gate hinged along its lower margin so as to be swingable outwardly, an operator for said gate comprising:

a cable track sector mounted on said cargo box at one end of said gate to rotate about a common axis with said gate, one end of said sector being coupled to said gate at a point above said lower margin;

a motive drive system mounted on the bottom side of said cargo box for movement therewith;

a cable coupled at one end to said track sector and at the other end to said drive system;

and means for routing said cable along said cargo box between said track sector and said drive system, operation of said drive system working said track sector by means of said cable to effect opening and closing swinging of said gate;

said motive drive system being operative to work said track sector in any adjusted position of said cargo box.

2. A system as defined in claim 1 which further includes a second cable track sector mounted at the other end of said gate to rotate about a common axis with said gate, one end of said second track sector being coupled to said gate at a point above said lower margin;

a second cable coupled at one end to said second track sector and at the other end to said drive system;

and means for routing said second cable along said cargo box between said second track sector and said motive drive system, operation of said motive driving system working both of said track sectors in unison by means of said cables to effect said opening and closing.

3. A system as defined in claim 1 in which said drive system includes a linear motor having an active element movable in a direction parallel with the bottom of said cargo box.

4. A system as defined in claim 1 in which said track sector includes a peripheral track in which said cable is received as said sector rotates to effect opening of said gate.

5. A system as defined in claim 4 in which said track sector is a segment of a circular disc.

6. A system as defined in claim 1 which includes resilient means for loading said cable and maintaining tension therein during all operational modes of said drive system.

7. A system as defined in claim 1 which further includes means for maintaining said cable guided onto the periphery of said track sector.

8. A system as defined in claim 1 in which said cargo box is elongated in the direction of normal movement of said vehicle, and in which said gate constitutes one longitudinal wall forming one side of said box.

9. A system as defined in claim 1 which further includes means hinging said cargo box to enable tilting thereof essentially about said lower margin; and power means to effect said tilting.

10. In a vehicle system having a cargo box with at least one normally upright gate hinged along its lower margin so as to be swingable outwardly, an operator for said gate comprising:

a cable track sector mounted at one end of said gate to rotate about an axis as said gate is swung, one end of said sector being coupled to said gate at a point above said lower margin;

a motive drive system mounted on the bottom side of said cargo box;

a cable coupled at one end to said track sector and at the other end to said drive system;

and means for routing said cable between said track sector and said drive system, operation of said drive system working said track sector by means of said cable to effect opening and closing swinging of said gate;

said track sector including a peripheral track in which said cable is received as said sector rotates to effect opening of said gate, said track sector being a segment of an ellipse, being mounted for rotation near one end thereof and being coupled to said gate near the other end thereof.

* * * * *